No. 654,427. Patented July 24, 1900.
J. C. F. ATSATT.
POULTRY FEEDER.
(Application filed Mar. 30, 1900.)
(No Model.)

Witnesses,
Edward F. Allen.
Adolf C. Kaiser.

Inventor;
John C. F. Atsatt,
by Crosby Gregory.
attys.

UNITED STATES PATENT OFFICE.

JOHN C. F. ATSATT, OF MATTAPOISETT, MASSACHUSETTS.

POULTRY-FEEDER.

SPECIFICATION forming part of Letters Patent No. 654,427, dated July 24, 1900.

Application filed March 30, 1900. Serial No. 10,732. (No model.)

*To all whom it may concern:*

Be it known that I, JOHN C. F. ATSATT, of Mattapoisett, county of Plymouth, State of Massachusetts, have invented an Improvement in Poultry-Feeders, of which the following description, in connection with the accompanying drawings, is a specification, like letters on the drawings representing like parts.

This invention has for its object the production of a sanitary, effective, and simple feed-pan for poultry, so constructed that the chickens cannot get into the pan or tip it over, and also preventing waste and soiling of the food in the pan.

In accordance with my invention a feed-pan is removably mounted in a suitable frame at a convenient height from the ground and adapted to tip or tilt slightly in one direction or the other by the weight of a fowl upon its edge. The tipping of the pan operates automatically a guard which swings rapidly toward and strikes the fowl and throws or forces it off of the pan, whereupon the pan and guard return to normal position.

Figure 1:
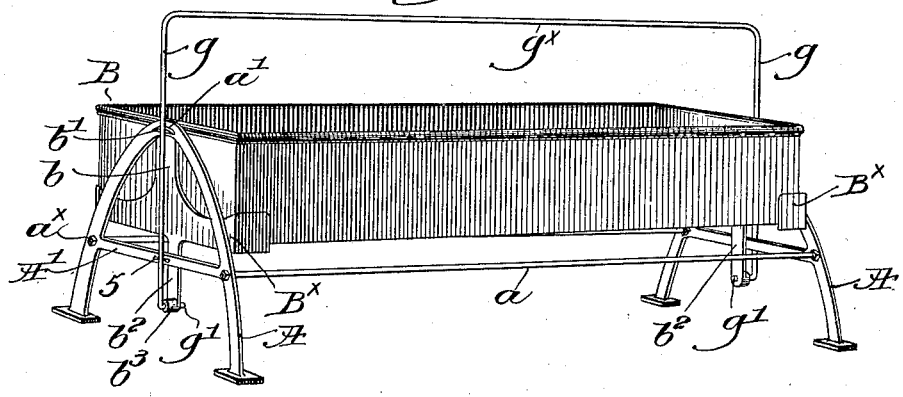
Figure 2:
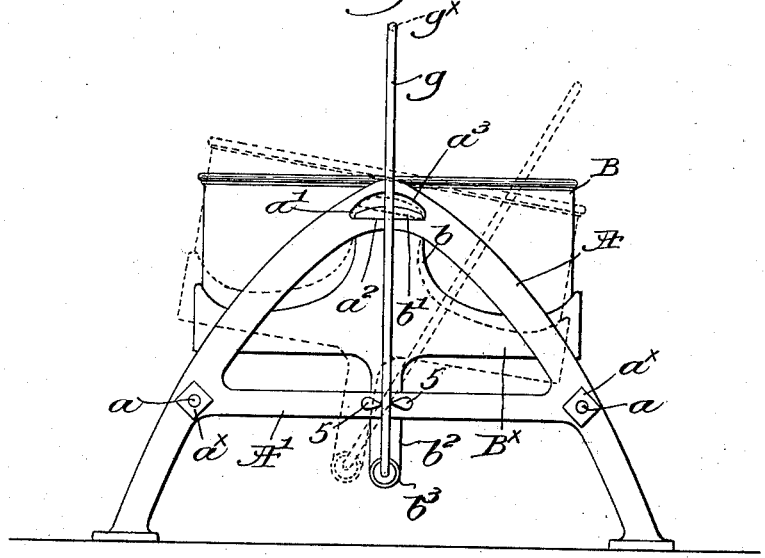

Figure 1 is a perspective view of a poultry-feeder embodying my invention; and Fig. 2 is an enlarged end elevation thereof, the position of the guard when the pan is tipped being shown in dotted lines.

The frame herein shown comprises suitable upright ends A, rigidly connected by rods $a$, held in place by nuts $a^x$, screwed tightly onto their threaded ends, each end piece having in its upper portion a hole $a'$, flat on its lower edge at $a^2$ and curved at its upper edge, as at $a^3$, Fig. 2. An oblong pan B, preferably made of galvanized iron, is detachably mounted in suitable castings $B^x$, located at its ends, the upturned central portions $b$ of the castings having outwardly-extended lugs $b'$ near the top of the pan plano-convex in cross-section to freely enter the holes $a'$ in the end pieces A, the flat faces of said lugs normally resting squarely on the bottoms of the holes $a'$. As the center of gravity of the pan is below the lugs $b'$, the pan is normally maintained by its weight in full-line position, Fig. 2; but the weight of a fowl on one edge tips or tilts it, one corner of the lug $b'$ acting as the fulcrum, and the pan can only tip by the amount of clearance between the other corner of the lug and the top of the hole $a'$. Each casting $B^x$ has a central depending arm $b^2$, provided with a bearing $b^3$ at its lower end, and the guard $g^x$ is shown as a rod or piece of stout wire extended longitudinally above the center of the pan and downturned at its ends, as at $g$, outside of the frame, said ends being inturned at their lower extremities at $g'$ to enter loosely the bearings $b^3$. The cross-bars A' of the ends A are provided with guide projections 5 5, between which the upright portions $g$ of the guard extend and about which the guard swings as a fulcrum.

Should a fowl jump onto the edge of the pan, the latter will tip into dotted-line position, Fig. 2, and the arms $b^2$ swing the downturned legs $g$ on the fulcrum-lugs 5 5, so that the guard is swung rapidly over toward the depressed side of the pan, giving the fowl a smart rap on the head or throwing it off the pan, a very slight tip of the pan giving a long quick swing to the guard, owing to the proximity of the fulcra 5 5 and the bearings $b^3$. As soon as the weight is removed the pan and guard resume their normal positions, Fig. 1, and full lines, Fig. 2. With this construction the chickens cannot hop into or roost upon the pan, and hence cannot scratch the food out or soil it, and waste and uncleanliness are prevented, and the pan cannot be tipped over and the food spilled on the ground.

My invention is not restricted to the precise construction and arrangement shown, as the same may be modified or rearranged in various particulars without departing from the spirit and scope of my invention.

Having fully described my invention, what I claim, and desire to secure by Letters Patent, is—

1. In a poultry-feeder, a supporting-frame, a pan mounted therein to have a limited tipping movement, and a guard movable automatically by tipping of the pan toward the depressed edge thereof.

2. In a poultry-feeder, a supporting-frame, a pan mounted therein to have a limited tipping movement, and a guard extended above the pan from one to the other end and fulcrumed on the ends of the frame, said guard being connected with the pan to be swung by tipping movement of the latter, toward the depressed edge of the pan.

3. In a poultry-feeder, a supporting-frame, a pan having supporting-fulcra above its center of gravity, journaled in the frame, a swinging guard normally located centrally above the pan, and connections between the latter and the guard, to swing said guard toward the depressed side of the pan when the latter is tipped on its fulcra.

4. In a poultry-feeder, a frame having upturned ends, a tipping pan provided above its center of gravity with flattened journals to enter holes in the ends of the frame, a guard extended centrally above the pan and having downturned ends, fulcra for said ends on the frame, and arms depending below the pan and pivotally connected with the lower extremities of the downturned ends of the guard, to swing the latter toward the depressed side of the pan when the latter is tipped.

5. In a poultry-feeder, a rigid frame, a tipping pan provided with shifting fulcra above its center of gravity and supported by the frame, means to limit the tipping movement of the pan, and an overhead, swinging guard operatively connected with the pan, movable toward the depressed edge thereof when the pan is tipped.

In testimony whereof I have signed my name to this specification in the presence of two subscribing witnesses.

JOHN C. F. ATSATT.

Witnesses:
  J. R. BOWLIN,
  I. P. ATSATT.